United States Patent
Pedersen

(10) Patent No.: US 10,616,697 B2
(45) Date of Patent: Apr. 7, 2020

(54) HEARING INSTRUMENT WITH AN AUTHENTICATION PROTOCOL

(71) Applicant: GN ReSound A/S, Ballerup (DK)

(72) Inventor: Brian Dam Pedersen, Ringsted (DK)

(73) Assignee: GN RESOUND A/S, Ballerup (DK)

( * ) Notice: Subject to any disclaimer, the term of this patent is extended or adjusted under 35 U.S.C. 154(b) by 0 days.

(21) Appl. No.: 14/548,892

(22) Filed: Nov. 20, 2014

(65) Prior Publication Data

US 2016/0142912 A1    May 19, 2016

(30) Foreign Application Priority Data

Nov. 14, 2014   (DK) ................................ 2014 70704
Nov. 14, 2014   (EP) ..................................... 14193328

(51) Int. Cl.
| | | |
|---|---|---|
| *H04W 12/06* | (2009.01) | |
| *H04R 25/00* | (2006.01) | |
| *H04L 29/06* | (2006.01) | |
| *H04W 12/00* | (2009.01) | |
| *H04W 12/04* | (2009.01) | |
| *H04R 27/02* | (2006.01) | |
| *H04W 12/10* | (2009.01) | |

(52) U.S. Cl.
CPC ....... *H04R 25/554* (2013.01); *H04L 63/0428* (2013.01); *H04L 63/061* (2013.01); *H04R 27/02* (2013.01); *H04W 12/0013* (2019.01); *H04W 12/04* (2013.01); *H04R 2225/55* (2013.01); *H04W 12/10* (2013.01)

(58) Field of Classification Search
CPC .................................................. H04W 12/06
USPC ......................................................... 380/259
See application file for complete search history.

(56) References Cited

U.S. PATENT DOCUMENTS

| | | | |
|---|---|---|---|
| 6,157,719 A | 12/2000 | Wasilewski et al. | |
| 6,510,519 B2* | 1/2003 | Wasilewski | H04N 21/63345 |
| | | | 348/E5.004 |
| 7,203,312 B1* | 4/2007 | Hatanaka | H04L 63/0428 |
| | | | 380/201 |
| 2003/0165239 A1 | 9/2003 | Bantz et al. | |
| 2005/0036628 A1* | 2/2005 | Devito | G11B 27/034 |
| | | | 381/61 |
| 2007/0014536 A1* | 1/2007 | Hellman | G11B 27/034 |
| | | | 386/259 |

(Continued)

FOREIGN PATENT DOCUMENTS

| | | |
|---|---|---|
| CN | 1382291 A | 11/2002 |
| EP | 2 040 393 A1 | 3/2009 |

(Continued)

OTHER PUBLICATIONS

Extended European Search Report dated May 4, 2015, for corresponding European Patent Application No. 14193328.3, 9 pages.

(Continued)

*Primary Examiner* — Jacob Lipman
(74) *Attorney, Agent, or Firm* — Vista IP Law Group, LLP

(57) ABSTRACT

A hearing instrument includes: a radio for reception of a broadcasted signal having a message, at least a part of the message has been encrypted with a first key, wherein the first key has been encrypted with a second key; an authenticator configured for authentication of the message by decrypting the first key with a third key, and decrypting the at least a part of the message with the first key; and a processing unit for converting the message into an acoustic signal for transmission towards an eardrum of a user of the hearing instrument.

24 Claims, 3 Drawing Sheets

(56) References Cited

U.S. PATENT DOCUMENTS

| | | |
|---|---|---|
| 2007/0189535 A1 | 8/2007 | Lee et al. |
| 2009/0015370 A1 | 1/2009 | Rowse |
| 2010/0293227 A1 | 11/2010 | Hasler et al. |
| 2016/0241399 A1* | 8/2016 | Huang .................. H04L 9/30 |

FOREIGN PATENT DOCUMENTS

| | | |
|---|---|---|
| EP | 2528358 A1 | 11/2012 |
| EP | 2 658 251 A1 | 10/2013 |
| EP | 2755403 A1 | 7/2014 |
| JP | 2010-245897 A | 10/2010 |
| WO | WO 2006/029043 A1 | 3/2006 |
| WO | WO 2007/046748 A1 | 4/2007 |

OTHER PUBLICATIONS

First Technical Examination and Search Report dated Jan. 26, 2015, for corresponding Danish Patent Application No. PA 2014 70704, 9 pages.

European Communication pursuant to Article 94(3) EPC dated Feb. 9, 2017 for corresponding EP Patent Application No. 14193328.3, 6 pages.

European Communication pursuant to Article 94(3) EPC dated Sep. 21, 2017 for corresponding EP Patent Application No. 14193328.3, 6 pages.

Agent Report of First Chinese Office action and English Translation dated May 21, 2019 for corresponding CN Patent Application No. 201510780563.1, 30 pages.

Agent Comments of First Chinese Office action dated Jun. 19, 2019 for corresponding CN Patent Application No. 201510780563.1, 30 pages.

Notice of Rejection dated Oct. 1, 2019 for corresponding Japanese Application JP 2015-222432.

Shoko Motoik et al. "Contents Distribution Service Using DVDs" Matsushita Technical Journal, Matsushita Electric Industrial Co., ltd, dated Oct. 18, 1998, vol. 44, No. 5, pp. 25-33.

* cited by examiner

HEARING INSTRUMENT WITH AN AUTHENTICATION PROTOCOL

RELATED APPLICATION DATA

This application claims priority to and the benefit of Danish Patent Application No. PA 2014 70704, filed on Nov. 14, 2014, pending, and European Patent Application No. 14193328.3, filed on Nov. 14, 2014, pending. The entire disclosures of both of the above applications are expressly incorporated by reference herein.

FIELD OF TECHNOLOGY

A new hearing instrument is provided with a radio configured for reception of a broadcasted signal having a message, such as a spoken message or a text message, which has been encrypted for subsequent authentication. The hearing instrument also has an authenticator configured for authentication of the message, and wherein the new hearing instrument is further configured for converting the message into an acoustic signal for transmission towards an eardrum of a user of the new hearing instrument upon successful authentication of the message.

BACKGROUND

Recently hearing aids have emerged that are capable of presenting sound received from various sources to a user of the hearing aid. Examples of sources include mobile phones, radios, media players, companion microphones, broadcasting systems, e.g. used in a public place, e.g. in a church, an auditorium, a theatre, a cinema, etc., public address systems, e.g. used in a railway station, an airport, a shopping mall, etc., etc.

For example, it is well known to use a telecoil to magnetically pick up audio signals generated, e.g., by telephones, FM systems (with neck loops), and induction loop systems (also called "hearing loops"), whereby sound may be transmitted to hearing aids with a high signal to noise ratio. More recently, hearing aids have been equipped with radio circuits for reception of radio signals, e.g. replacing or supplementing telecoils, for reception of streamed audio in general, such as streamed music and speech from media players, such as MP3-players, TV-sets, etc. Hearing aids have also emerged that connect with various sources of audio signals through a short-range network, e.g. utilizing Bluetooth technology, e.g. to interconnect the hearing aid with cellular phones, audio headsets, computer laptops, personal digital assistants, digital cameras, etc. Other radio networks have also been suggested, namely HomeRF, DECT, PHS, Wireless LAN (WLAN), or other proprietary networks.

SUMMARY

In some situations, for example in a public place, it is desirable for a user wearing a hearing instrument to be able to listen to broadcasted messages, such as spoken messages, or text messages converted into spoken messages, such as public announcements, e.g. train, ship or flight departures or delays, with certainty that the broadcasted message is authentic, i.e. the broadcasted message has been created for broadcasting by an authentic source.

Thus, there is a need for a broadcasting scheme facilitating authentication of broadcasted messages, e.g. so that spoofing is eliminated or the risk of spoofing is reduced.

Thus, a method of authenticating messages is provided, comprising the steps of:
encoding part of the message for broadcasting,
encrypting the part of the message with a first key,
encrypting the first key with a second key,
broadcasting the encrypted first key,
broadcasting the encrypted part of the message, and
in a device receiving the encrypted first key and the encrypted part of the message:
Decrypting the first key with a third key,
decrypting the part of the message with the first key, and
converting the part of the message into an acoustic signal for transmission towards an eardrum of a human.

Further, a broadcasting system is provided, comprising
an encoder configured for encoding part of a message for broadcasting,
an encryption unit configured for
encrypting the part of the message with a first key and
encrypting the first key with a second key, and
a transmitter configured for broadcasting a signal having the encrypted first key and the encrypted part of the message, and
a hearing instrument comprising
a radio for reception of the signal having the encrypted first key and the encrypted part of the message,
an authenticator configured for authentication of the message by decrypting the first key with a third key,
decrypting the encrypted first key with the first key, and
wherein
the hearing instrument is further configured for converting the message into an acoustic signal for transmission towards an eardrum of a user of the hearing instrument.

Thus, a hearing instrument is also provided, comprising a radio for reception of a broadcasted signal having
a message that has been encrypted with a first key, and
the first key that has been encrypted with a second key, an authenticator configured for
authentication of the message by decrypting the first key with a third key,
decrypting the part of the message with the first key, and
the hearing instrument is further configured for converting the message into an acoustic signal for transmission towards an eardrum of a user of the hearing instrument.

The encrypted first key may be broadcasted together with a part of the encrypted message that has been encrypted with the first key.

Broadcasting of the message may include
broadcasting a sequence of encrypted parts of the message, each of which having
been encrypted with the same first key, and
broadcasting the first key encrypted with the second key, e.g. before or after broadcasting the sequence of encrypted parts of the message encrypted with the same first key, preferably together with the last broadcasted encrypted part of the message encrypted with the same first key, and
in the hearing instrument
receiving and storing the broadcasted encrypted parts of the message and decrypting the parts of the message with the first key upon reception of the encrypted first key.

The reduced rate of broadcasting of the encrypted first key has the advantage of reducing power consumption in the hearing instrument.

Preferably, the message is encoded using an error checking code, e.g. a CRC-code.

Preferably, successful authentication includes correct verification of the received parts of the message using the error checking code. This may for example prevent transmission of noise to an ear of the user of the hearing instrument in the event that a key has been unsuccessfully used in an attempt to decrypt part(s) of the encrypted message.

Preferably, the second key is a private key and the third key is a public key.

Preferably, the hearing instrument comprises the third key. The third key may be entered into the hearing instrument during its manufacturing. Alternatively, or additionally, the third key may be entered into the hearing instrument at a kiosk, for example during check-in in an airport, and/or by fitting software and/or using an app stored in a smartphone, and/or using a computer connected with the Internet, etc.

The hearing instrument may be a hearing aid, such as a BTE, RIE, ITE, ITC, CIC, etc., a binaural hearing aid; an Ear-Hook, In-Ear, On-Ear, Over-the-Ear, Behind-the-Neck, Helmet, Headguard, etc., headset, headphone, earphone, ear defender, earmuff, etc.

The message may be a text message that is converted into speech in the hearing instrument. Preferably, the message is a spoken message.

Throughout the present disclosure a broadcasted signal is a signal that can be received by a plurality of receivers in any form it may take from generation of the signal, e.g. the acoustic output from a human making an announcement, to transmission towards an eardrum of a user of the hearing, including the digitized signal in a form suitable for wireless transmission and in a form suitable for signal processing in the hearing instrument.

The digitized signal including the message may be divided and transmitted wirelessly in packages or packets as is well-known in the art of wireless transmission. A package typically includes data, e.g. digitized audio, and control information and data. The data is also known as the payload or the payload data. The control information typically provides information data that a network needs in order to deliver the data or payload to the intended receiver(s), for example: source and destination device addresses, error detection codes, and sequencing information. Typically, control information is found in packet headers and trailers, with payload data in between.

The hearing instrument may be configured for muting at least one other signal received by the hearing instrument, for example the signal from the microphone(s) of the hearing instrument, during transmission of the message towards the eardrum of the user of the hearing instrument, upon successful authentication of the message. In this way, the user is allowed to concentrate on announcements while possible distractions are reduced.

The hearing instrument may be configured for ignoring the message upon failed authentication of the message, so that the hearing instrument user will not be bothered with messages from unauthorized transmitters.

The hearing instrument may have a mixer with an input connected to an output of the radio receiving the message and other inputs connected to other transmitters of audio signals, such as microphone(s) of the hearing instrument, and an output providing an audio signal that is a weighted combination of the audio signals input to the mixer.

In the mixer, muting may be performed by setting the weights of other signals than the message to zero.

In the mixer, ignoring messages from unauthorized transmitters may be performed by setting the weight of the message to zero.

In the event that the authenticator does successfully authenticate the transmitter of the message, the hearing instrument may be configured to adjust the weights of the mixer so that other signals currently transmitted to the user are attenuated during transmission of the message to the user so that the message can be clearly heard by the user without the user simultaneously loosing connection with other signals received by the hearing instrument. For example, attenuation of acoustic signals from the surroundings of the user received by a microphone of the hearing instrument during transmission of the message, allows the user to stay connected with the surroundings while simultaneously listening to the message.

The hearing instrument may simultaneously receive more than one authenticated message; i.e. one or more messages may be received during ongoing reception of a previous message, whereby more than one authenticated message may overlap fully or partly in time.

Such a situation may be handled in various ways. For example, messages may have assigned priorities and may be transmitted together with information on the priority, e.g. an integer, e.g. larger than or equal to 1, e.g. the lower the integer, the higher the priority. Alarm messages may for example have the highest priority, while traffic announcements may have the second highest priority, and possible commercials may have the lowest priority.

Successfully authenticated messages may be presented to the hearing instrument user one at the time in their order of priority, e.g. an authenticated message of highest priority may be transmitted to the hearing instrument user without delay, while other messages are stored intermediately for subsequent presentation to the hearing instrument user in their order of priority.

Alternatively, successfully authenticated messages may be presented to the hearing instrument user one at the time in the same order in which they have been received by the hearing instrument.

Alternatively, successfully authenticated messages may be transmitted to the user of the hearing instrument with substantially unchanged timing with relation to each other. The mixer may treat each individual successfully authenticated message as a separate input to the mixer similar to other audio transmitters input to the mixer as explained above. The individual successfully authenticated messages may be weighted in the mixer, e.g. according to their priority.

The hearing instrument may be configured to always mute one or more other signals received by the hearing instrument during transmission of a message of highest priority towards the eardrum of the user of the hearing instrument.

The hearing instrument may have a user interface, e.g. a push button, a remote control, etc. so that the user can switch muting of other signals on and off as desired in order to be able to or not be able to, respectively, continue to listen to other sound signals while receiving a broadcast, as desired.

The user interface may further include means for user adjustment of the weights of the combination of the input audio signals, such as a dial, or a push button for incremental adjustment.

In order for the hearing instrument to be able to authenticate the source of a message, a digital signature uniquely identifying the source of the message may be broadcasted.

The first key may be included in a digital signature signed with the second key and verified by the third key.

The digital signature may include a digital certificate issued by a certificate authority.

The digital signature may include a hash code, such as a message authentication code, in order for the hearing instrument to be able to authenticate the source of the message in a cryptographically simple way.

Signal processing in the new hearing instrument may be performed by dedicated hardware or may be performed in one or more signal processors, or performed in a combination of dedicated hardware and one or more signal processors.

As used in this specification, the term "processing unit" refers to any entity or item that is capable of performing signal processing. For examples, the processing unit may be a processor, a signal processor, an integrated circuit, a circuit component, etc. Also, the processing unit may include a software component.

Also, as used herein, the terms "processor", "signal processor", etc., are intended to refer to CPU-related entities, either hardware, a combination of hardware and software, software, or software in execution.

For example, a "processor", "signal processor", etc., may be, but is not limited to being, a process running on a processor, a processor, an object, an executable file, a thread of execution, and/or a program.

By way of illustration, the terms "processor", "signal processor", etc., designate both an application running on a processor and a hardware processor. One or more "processors", "signal processors", and the like, or any combination hereof, may reside within a process and/or thread of execution, and one or more "processors", "signal processors", etc., or any combination hereof, may be localized on one hardware processor, possibly in combination with other hardware circuitry, and/or distributed between two or more hardware processors, possibly in combination with other hardware circuitry.

A hearing instrument includes: a radio for reception of a broadcasted signal having a message, at least a part of the message has been encrypted with a first key, wherein the first key has been encrypted with a second key; an authenticator configured for authentication of the message by decrypting the first key with a third key, and decrypting the at least a part of the message with the first key; and a processing unit for converting the message into an acoustic signal for transmission towards an eardrum of a user of the hearing instrument.

Optionally, the processing unit is configured for muting at least one other signal received by the hearing instrument upon successful authentication of the message.

Optionally, the processing unit comprises a mixer for mixing the message with at least one other signal received by the hearing instrument upon successful authentication of the message to obtain a mixed output, and wherein the processing unit is configured for converting the mixed output into the acoustic signal for transmission towards the eardrum of the user of the hearing instrument.

Optionally, the processing unit is configured for ignoring the broadcasted signal upon failed authentication of the message in the broadcasted signal.

Optionally, the processing unit comprises a mixer for mixing the message in the broadcasted signal with an additional message to obtain a mixed output, at least a part of the additional message overlaps with at least a part of the message in the broadcasted signal in time.

Optionally, the hearing instrument further includes a medium, such as a memory, such as a semiconductor memory, for storing a first additional message that is received during transmission of the acoustic signal towards the eardrum of the user of the hearing instrument.

Optionally, processing unit is further configured for converting the stored first additional message into an additional acoustic signal for transmission towards the eardrum of the user of the hearing instrument.

Optionally, the medium is also for storing a second additional message, and wherein the processing unit is configured for converting the first and second additional messages into respective acoustic signals for transmission towards the eardrum of the user of the hearing instrument in an order in which the first and second additional messages are received by the hearing instrument.

Optionally, the medium is also for storing a second additional message, and wherein the processing unit is configured for converting the first and second additional messages into respective acoustic signals for transmission towards the eardrum of the user of the hearing instrument in an order of priority.

A method of communicating a message includes: encoding a part of the message for broadcasting; encrypting the part of the message with a first key; encrypting the first key with a second key; broadcasting the encrypted first key for reception by a device; and broadcasting the encrypted part of the message for reception by the device, wherein the device is configured for receiving the encrypted first key and the encrypted part of the message, decrypting the first key with a third key, decrypting the part of the message with the first key, and converting the part of the message into an acoustic signal for transmission towards an eardrum of a human.

Optionally, the method further includes: receiving the encrypted first key and the encrypted part of the message by the device; decrypting the first key with the third key; decrypting the part of the message with the first key; and converting the part of the message into the acoustic signal for transmission towards the eardrum of the human.

Optionally, the act of decrypting the part of the message comprises decrypting multiple sub-parts of the message with the first key.

Optionally, the act of broadcasting the encrypted first key and the act of broadcasting the encrypted part of the message are performed so that the encrypted first key is broadcasted together with the part of the message.

Optionally, the method further includes encoding the part of the message with an error checking code.

Optionally, the second key comprises a private key and the third key comprises a public key.

A broadcasting system includes: an encoder configured for encoding a part of a message for broadcasting; an encryption unit configured for encrypting the part of the message with a first key, and encrypting the first key with a second key; and a transmitter configured for broadcasting the encrypted first key and the encrypted part of the message for reception by a hearing instrument; wherein the hearing instrument comprises a radio for reception of the message and the encrypted first key, an authenticator configured for authentication of the message by decrypting the first key with a third key, and decrypting the part of the message with the first key, and a processing unit configured for converting the message into an acoustic signal for transmission towards an eardrum of a user of the hearing instrument.

Optionally, the broadcasting system further includes the hearing instrument.

Other and further aspects and features will be evident from reading the following detailed description of the embodiments.

BRIEF DESCRIPTION OF THE DRAWINGS

In the following, preferred embodiments of the new hearing instrument are explained in more detail with reference to the drawing, wherein.

DETAILED DESCRIPTION OF THE DRAWINGS

Figure 1:
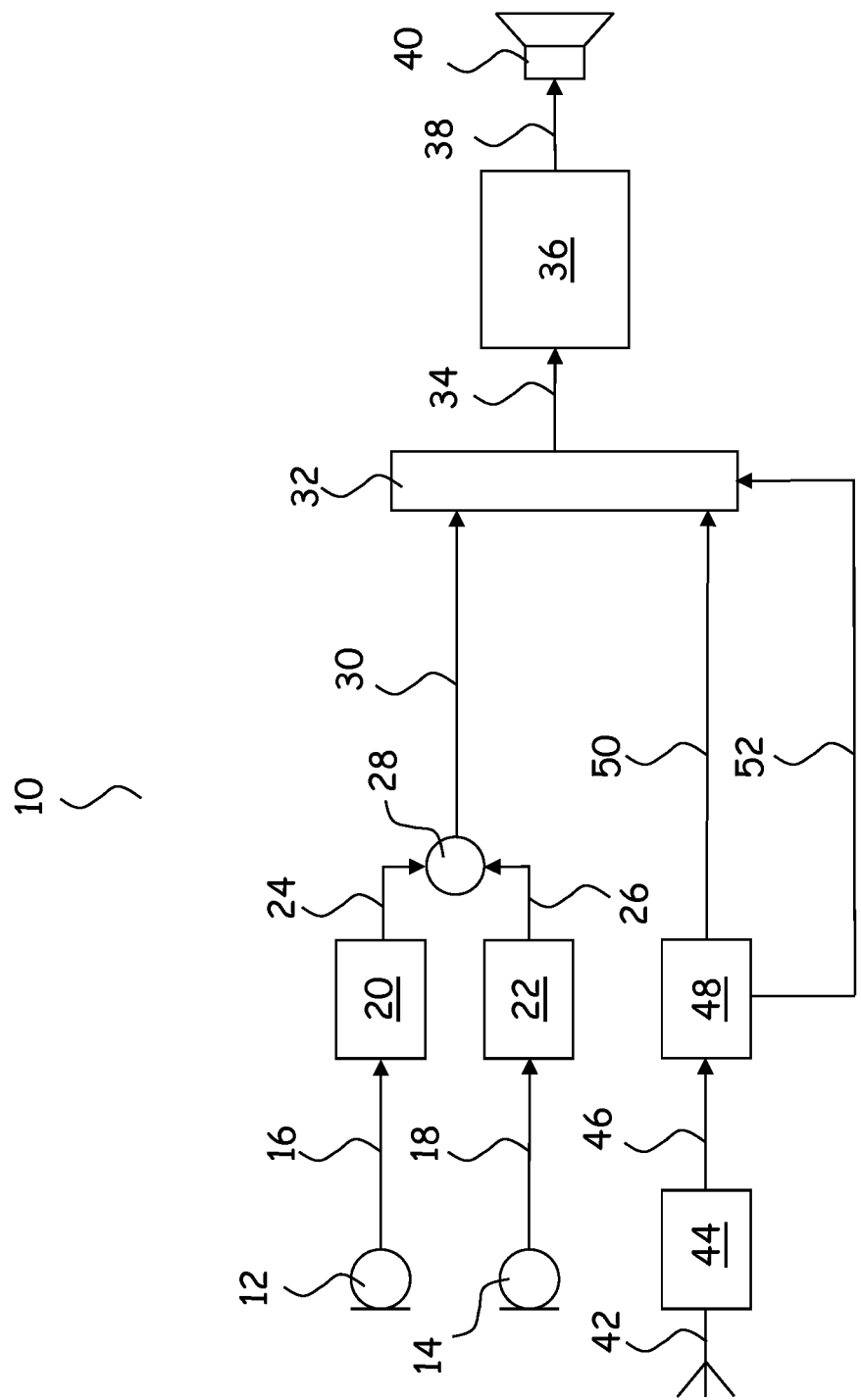
FIG. 1 schematically illustrates electronic circuitry of the new hearing instrument, FIG. 2 schematically illustrates encryption of the message to be broadcasted, and FIG. 3 schematically illustrates authentication of the message.

Various embodiments are described hereinafter with reference to the figures. It should be noted that the figures may or may not be drawn to scale and that elements of similar structures or functions are represented by like reference numerals throughout the figures. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The new method and hearing instrument will now be described more fully hereinafter with reference to the accompanying drawings, in which various examples of the new method and hearing instrument are illustrated. The new method and hearing instrument according to the appended claims may, however, be embodied in different forms and should not be construed as limited to the examples set forth herein.

FIG. 1 schematically illustrates exemplary hearing instrument circuitry 10 of the new hearing instrument. The illustrated new hearing instrument is a hearing aid that may be of any suitable mechanical design, e.g. to be worn in the ear canal, or partly in the ear canal, behind the ear or in the concha, such as the well-known types: BTE, ITE, ITC, CIC, etc.

The illustrated hearing instrument circuitry 10 comprises a front microphone 12 and a rear microphone 14 for conversion of an acoustic sound signal from the surroundings into corresponding microphone audio signals 16, 18 output by the microphones 14, 16. The microphone audio signals 16, 18 are digitized in respective A/D converters 20, 22 for conversion of the respective microphone audio signals 16, 18 into respective digital microphone audio signals 24, 26 that are optionally pre-filtered (pre-filters not shown) and combined in signal combiner 28, for example for formation of a digital microphone audio signal 30 with directionality as is well-known in the art of hearing instruments. The digital microphone audio signal 30 is input to the mixer 32 configured to output a weighted sum 34 of signals input to the mixer 32. The mixer output 34 is input to a hearing loss processor 36 configured to generate a hearing loss compensated output signal 38 based on the mixer output 34. The hearing loss compensated output signal 38 is input to a receiver 40 for conversion into acoustic sound for transmission towards an eardrum (not shown) of a user of the hearing instrument.

The illustrated hearing instrument circuitry 10 is further configured to receive digital audio from various transmitters, such as mobile phones, radios, media players, companion microphones, broadcasting systems, such as in a public place, e.g. in a church, an auditorium, a theatre, a cinema, etc., public address systems, such as in a railway station, an airport, a shopping mall, etc., etc.

In the illustrated example, digital audio, including broadcasted encrypted spoken messages, is transmitted wirelessly to the hearing instrument and received by the hearing instrument antenna 42 connected to a radio 44. The radio retrieves the digital data 46 from the received radio signal, including the encrypted spoken message, possible transmitter identifiers, possible network control signals, etc. Authenticator 48 extracts an encrypted first key, e.g. contained in a digital signature, from the radio signal 46 and decrypts the encrypted spoken message using the first key and forwards digital audio 50 to the mixer 32. The authenticator 48 may have one or more memories for storage of received parts of the encrypted spoken message for subsequent decryption upon receipt of the encrypted first key as further explained below.

The digital audio 50 may include audio from a plurality of sources and thus, the digital audio 50 may form a plurality of input signals for the mixer 32, one input signal for each source of audio.

As further explained below, Output authentication signal 52 forms a control input to the mixer 32 for control of the weights of the sum of mixer input signals.

Figure 2:
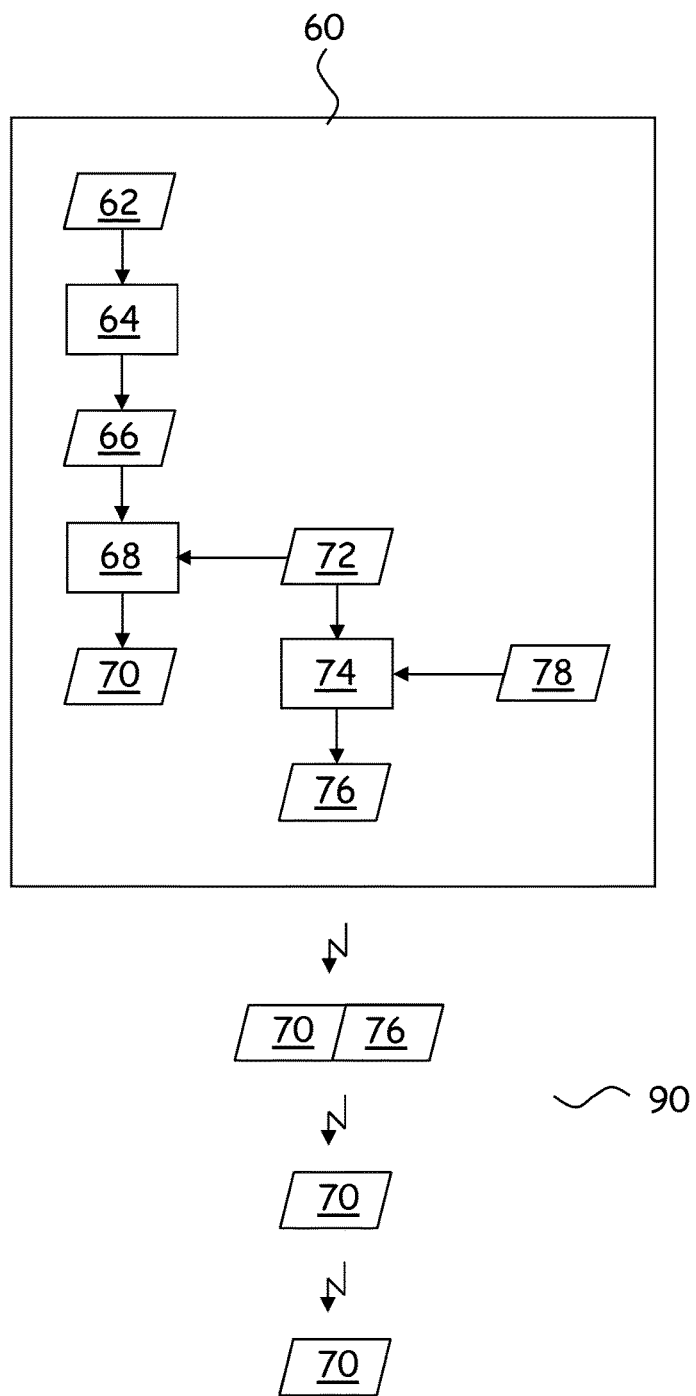
Figure 3:
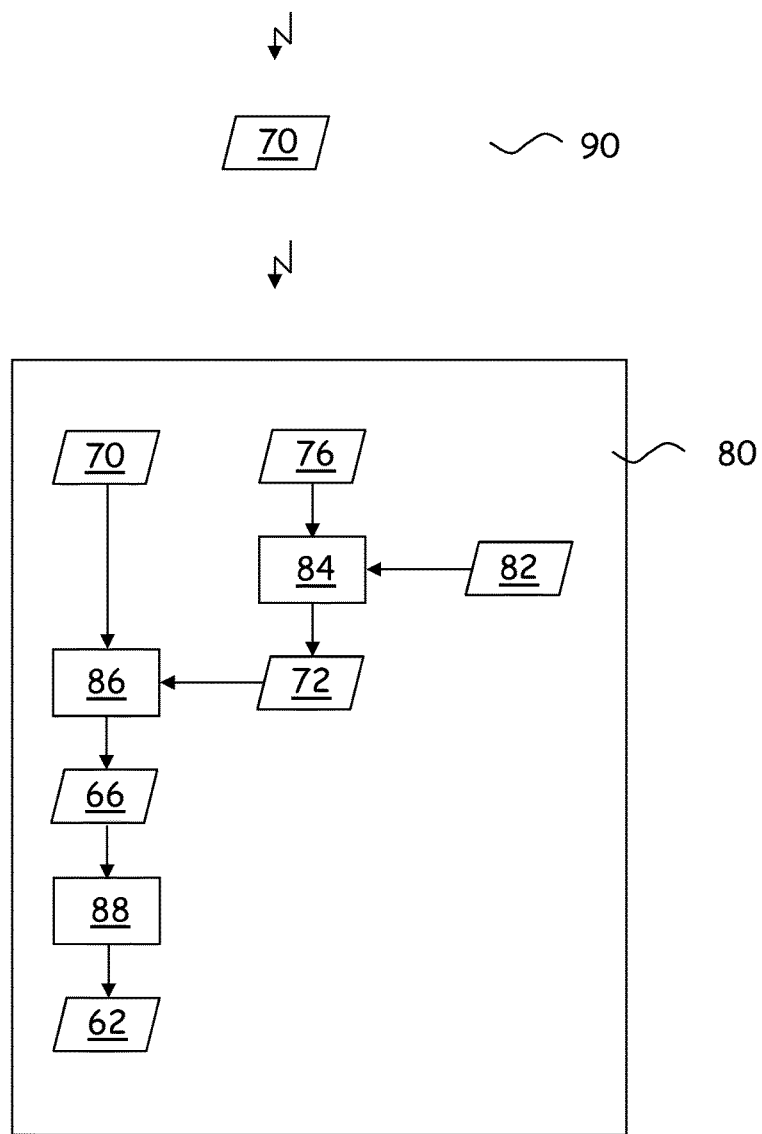

In the event that the message cannot be authenticated, the corresponding weight is set to zero in the mixer 32 so that the message 62, see FIGS. 2 and 3, is not transmitted to the user; rather the message 62 is ignored, whereby, e.g., the risk of spoofing is reduced.

In the event that the message is authenticated, the message is transmitted to the user while the other signals are attenuated during transmission of the message. The other signals may also be muted. The user may enter a command through a user interface of the hearing instrument of a type well-known in the art, controlling whether the other signals are muted or attenuated.

The hearing instrument may simultaneously receive more than one authenticated message; i.e. one or more messages may be received during ongoing reception of a previous message, whereby more than one authenticated message may overlap fully or partly in time.

Such a situation may be handled in various ways. For example, messages may have assigned priorities and may be transmitted together with information on the priority, e.g. an integer, e.g. larger than or equal to 1, e.g. the lower the integer, the higher the priority. Alarm messages may for example have the highest priority, while traffic announcements may have the second highest priority, and possible commercials may have the lowest priority.

Successfully authenticated messages may be handled by the mixer 32 as separate inputs like the other inputs to the mixer, whereby the mixer includes the individual messages in the weighted sum of inputs output to the processor 36, whereby the messages are transmitted to the user with substantially unchanged timing with relation to each other.

Alternatively, successfully authenticated messages may be transmitted to the hearing instrument user one at the time.

The mixer 32 may have one or more memories for storage of messages received during ongoing reception of a previous message. Stored messages may then be input to the mixer subsequent to finalized output of the previous message of the mixer 32 in the same order in which they have been received by the hearing instrument; or, in order of priority, for inclusion in the output of the mixer 32 provided that the message in question is successfully authenticated.

The hearing instrument may be configured to always mute one or more other signals received by the hearing instrument during transmission of a message of highest priority towards the eardrum of the user of the hearing instrument.

In some cases, the receiver 40 may be considered to be a processing unit, or a part of a processing unit, for converting the message into an acoustic signal for transmission towards an eardrum of a user of the hearing instrument. The processing unit may include other component(s), such as the processor 36, the mixer 32, A/D converters 20, 22, signal combiner 28, authenticator 48, the radio 44 or part of the radio, or any combination of the foregoing.

In one embodiment, the processing unit comprises the signal combiner 28, the mixer 32, the hearing loss processor 36, and the authenticator 48.

FIG. 2 illustrates exemplary operations 60 of preparing a message to be broadcasted for authentication. The authentic source of the message to be broadcasted may broadcast spoken messages, such as departure announcements in an airport.

In the illustrated example, the message is transmitted wirelessly and in digital form to a plurality of receivers. The message is encoded for broadcasting by digitizing the message and dividing the digitized message into message parts 62 of packets as is well-known in the art of wireless transmission.

In FIGS. 2 and 3 parallelograms indicate data, and rectangles indicate operations.

As illustrated in FIG. 2, in operation 64 CRC (Cyclic Redundancy Check) check bits are calculated for each message part 62 and added to the message part 62 to form message payload 66.

The message part 62 with CRC check bits is encrypted in 68 with a symmetric key, namely a first key 72, to form encrypted message payload 70 to be broadcasted as indicated at reference numeral 90.

The symmetric first key 72 is encrypted with a private key, namely a second key 78, in operation 74 to form encrypted first key 76, e.g. included in a digital signature, to be broadcasted as indicated at reference numeral 90.

As illustrated in FIG. 2, the encrypted first key 76 is not broadcasted with every encrypted message payload 70. Rather, a plurality of encrypted message payloads 70 is broadcasted without the encrypted first key for reception and storage in a hearing instrument for subsequent authentication and decryption upon receipt of the encrypted first key having been used for encryption of the stored encrypted message payloads 70.

In the example illustrated in FIG. 2, the encrypted first key 76 is broadcasted in a packet with the last encrypted message payload 70 that has been encrypted with the symmetric first key 72. The next message payload 66 is encrypted with a new symmetric key 72.

In another example, the encrypted first key 76 is broadcasted in a packet without an encrypted message payload 70.

In yet another example, the encrypted first key 76 is broadcasted together with another one of the encrypted message payloads 70 being encrypted with the symmetric first key 72, e.g. with the first encrypted message payload 70 encrypted with the symmetric first key 72.

In FIG. 3, the operations 80 performed in a hearing instrument receiving the broadcast are illustrated.

Upon receipt of the encrypted first key 76, the symmetric key 72 is decrypted using the third key 82, namely the public key 82.

In operation 86, the symmetric key 72 is then used to decrypt the received encrypted message payloads 70 into message payloads 66 and a CRC-check 88 is performed and the message part 62 is output and, provided that the CRC-check 88 is successful, the corresponding weight is set to a non-zero value in the mixer 32 so that the message 62 is converted into an acoustic signal for transmission towards an eardrum of the user of the hearing instrument.

The authentication process illustrated in principle in FIGS. 2 and 3 is relatively simple and suitable for implementation in a hearing instrument. The private key has to be distributed to all possible authentic sources of messages. Obviously, the distribution of the private key has to be performed with care, since anyone in possession of the private key will be able to generate messages that will be successfully authenticated in the new hearing instruments.

In the illustrated example, the hearing instrument comprises the public key 82. The public key may be entered into the hearing instrument during its manufacturing for global availability. Alternatively, or additionally, the public key may be entered into the hearing instrument at a kiosk, for example during check-in in an airport, and/or by fitting software and/or using an app stored in a smartphone, and/or using a computer connected with the Internet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A hearing instrument comprising:
a radio for reception of a broadcasted signal having a message, at least a part of the message has been encrypted with a first key, wherein the first key has been encrypted with a second key to result in an encrypted first key, and wherein the at least a part of the message that has been encrypted with the first key comprises information to be conveyed to a user of the hearing instrument;
an authenticator configured for authentication of the message by
decrypting the encrypted first key with a third key, and
decrypting the at least a part of the message with the first key; and
a processing unit for converting the message into an acoustic signal for transmission towards an eardrum of the user of the hearing instrument;
wherein the second key has a value that is different from a value of the third key;
wherein the hearing instrument is configured for worn by the user; and
wherein the message comprises (1) a first payload broadcasted with the encrypted first key, and (2) a second payload broadcasted without the encrypted first key.

2. The hearing instrument according to claim 1, wherein the processing unit is configured for muting at least one other signal received by the hearing instrument upon successful authentication of the message.

3. The hearing instrument according to claim 1, wherein the processing unit comprises a mixer for mixing the message with at least one other signal received by the hearing instrument upon successful authentication of the message to obtain a mixed output, and wherein the processing unit is configured for converting the mixed output into the acoustic signal for transmission towards the eardrum of the user of the hearing instrument.

4. The hearing instrument according to claim 1, wherein the processing unit is configured for ignoring the broadcasted signal upon failed authentication of the message in the broadcasted signal.

5. The hearing instrument according to claim 1, wherein the processing unit comprises a mixer for mixing the message in the broadcasted signal with an additional message to obtain a mixed output, at least a part of the additional message overlaps with at least a part of the message in the broadcasted signal in time.

6. The hearing instrument according to claim 1, further comprising a medium for storing a first additional message that is received during transmission of the acoustic signal towards the eardrum of the user of the hearing instrument.

7. The hearing instrument according to claim 6, wherein processing unit is further configured for converting the stored first additional message into an additional acoustic signal for transmission towards the eardrum of the user of the hearing instrument.

8. The hearing instrument according to claim 6, wherein the medium is also for storing a second additional message, and wherein the processing unit is configured for converting the first and second additional messages into respective acoustic signals for transmission towards the eardrum of the user of the hearing instrument in an order in which the first and second additional messages are received by the hearing instrument.

9. The hearing instrument according to claim 6, wherein the medium is also for storing a second additional message, and wherein the processing unit is configured for converting the first and second additional messages into respective acoustic signals for transmission towards the eardrum of the user of the hearing instrument in an order of priority.

10. The hearing instrument according to claim 1, wherein the hearing instrument is a headset or a hearing aid.

11. The hearing instrument according to claim 1, wherein the at least a part of the message is encoded with an error checking code, and wherein the processing unit is configured to perform a verification using the error checking code, and to convert the message into the acoustic signal if the verification is successful.

12. The hearing instrument of claim 1, wherein the broadcasted signal is also for reception by one or more additional hearing instrument(s) being used by one or more additional user(s).

13. A method of communicating a message, comprising:
encoding a part of the message for broadcasting;
encrypting the part of the message with a first key, wherein the part of the message that is encrypted with the first key comprises information to be conveyed to a user;
encrypting the first key with a second key to obtain an encrypted first key;
broadcasting the encrypted first key for reception by a device that is configured for worn by the user; and
broadcasting the encrypted part of the message for reception by the device, wherein the device is configured for receiving the encrypted first key and the encrypted part of the message, decrypting the first key with a third key, decrypting the part of the message with the first key, and converting the part of the message into an acoustic signal for transmission towards an eardrum of a human;
wherein the second key has a value that is different from a value of the third key; and
wherein the message comprises (1) a first payload broadcasted with the encrypted first key, and (2) a second payload broadcasted without the encrypted first key.

14. The method according to claim 13, wherein the act of broadcasting the encrypted first key and the act of broadcasting the encrypted part of the message are performed so that the encrypted first key is broadcasted together with the part of the message.

15. The method according to claim 13, further comprising encoding the part of the message with an error checking code.

16. The method according to claim 13, wherein the second key comprises a private key and the third key comprises a public key.

17. The method according to claim 13, wherein the part of the message is encoded with an error checking code, and wherein the device is configured to perform a verification using the error checking code, and to convert the part of the message into the acoustic signal if the verification is successful.

18. The method of claim 13, wherein the encrypted part of the message that has been broadcasted is also for reception by one or more additional device(s) being used by one or more additional user(s).

19. The method according to claim 13, further comprising:
receiving the encrypted first key and the encrypted part of the message by the device;
decrypting the first key with the third key;
decrypting the part of the message with the first key; and
converting the part of the message into the acoustic signal for transmission towards the eardrum of the human.

20. The method according to claim 19, wherein the act of decrypting the part of the message comprises decrypting multiple sub-parts of the message with the first key.

21. A broadcasting system comprising:
an encoder configured for encoding a part of a message for broadcasting;
an encryption unit configured for encrypting the part of the message with a first key, and encrypting the first key with a second key to obtain an encrypted first key, wherein the part of the message encrypted by the encryption unit comprises information to be conveyed to a user; and
a transmitter configured for broadcasting a signal having the encrypted first key and the encrypted part of the message for reception by a hearing instrument that is configured for worn by the user;
wherein the hearing instrument comprises a radio for reception of the signal having the message and the encrypted first key, an authenticator configured for authentication of the message by decrypting the first key with a third key, and decrypting the part of the message with the first key, and a processing unit configured for converting the message into an acoustic signal for transmission towards an eardrum of the user of the hearing instrument;
wherein the second key has a value that is different from a value of the third key; and
wherein the message comprises (1) a first payload transmitted with the encrypted first key, and (2) a second payload broadcasted without the encrypted first key.

22. The broadcasting system of claim 21, further comprising the hearing instrument.

23. The hearing instrument according to claim 21, wherein the part of the message is encoded with an error checking code, and wherein the processing unit is configured to perform a verification using the error checking code, and to convert the message into the acoustic signal if the verification is successful.

24. The broadcasting system of claim 21, wherein the encrypted part of the message broadcasted by the transmitter is also for reception by one or more additional hearing instrument(s) being used by one or more additional user(s).

\* \* \* \* \*